US012776712B2

(12) United States Patent
Xu

(10) Patent No.: US 12,776,712 B2
(45) Date of Patent: Oct. 27, 2026

(54) CONTROL CIRCUIT AND CONTROL METHOD OF MULTIPHASE POWER CONVERTER

(71) Applicant: Silergy Semiconductor Technology (Hangzhou) LTD, Hangzhou (CN)

(72) Inventor: Yi Xu, Hangzhou (CN)

(73) Assignee: Silergy Semiconductor Technology (Hangzhou) LTD., Hangzhou (CN)

(*) Notice: Subject to any disclaimer, the term of this patent is extended or adjusted under 35 U.S.C. 154(b) by 165 days.

(21) Appl. No.: 18/828,171

(22) Filed: Sep. 9, 2024

(65) Prior Publication Data

US 2025/0088111 A1 Mar. 13, 2025

(30) Foreign Application Priority Data

Sep. 11, 2023 (CN) ........................ 202311179626.9

(51) Int. Cl.
*H02M 3/158* (2006.01)
*H02M 1/00* (2006.01)

(52) U.S. Cl.
CPC ....... *H02M 3/1584* (2013.01); *H02M 1/0025* (2021.05)

(58) Field of Classification Search
CPC .......................... H02M 3/1584; H02M 1/0025
See application file for complete search history.

(56) References Cited

U.S. PATENT DOCUMENTS

| | | | | |
|---|---|---|---|---|
| 9,525,283 | B2 | 12/2016 | Xu | |
| 10,135,330 | B2 | 11/2018 | Zhang et al. | |
| 11,581,811 | B2 | 2/2023 | Hang et al. | |
| 11,818,815 | B2 | 11/2023 | Huang et al. | |
| 11,824,434 | B2 | 11/2023 | Yao et al. | |
| 12,328,074 | B2 * | 6/2025 | Bawa | H02M 3/1586 |
| 2014/0300331 | A1 | 10/2014 | Trimeloni et al. | |
| 2018/0351458 | A1 | 12/2018 | Chen et al. | |
| 2020/0395854 | A1 * | 12/2020 | Yao | H02M 1/32 |
| 2022/0209660 | A1 | 6/2022 | Sun et al. | |
| 2023/0057588 | A1 * | 2/2023 | Bawa | H02M 3/1586 |
| 2024/0014729 | A1 * | 1/2024 | Botti | H02M 1/32 |

* cited by examiner

*Primary Examiner* — Rafael O De Leon Domenech

(57) ABSTRACT

A method of controlling a multiphase power converter comprising a plurality of power stage circuits coupled in parallel, can include: in a first operation mode, controlling an operating timing sequence of the plurality of power stage circuits according to a reference signal and a feedback signal representing an output voltage of the multiphase power converter; and in a second operation mode, controlling the operating timing sequence of the plurality of power stage circuits according to a fixed time and a minimum turn-off time, in order to ensure that the operating timing sequence of the plurality of power stage circuits remains unchanged in response to transition of a load of the multiphase power converter.

20 Claims, 5 Drawing Sheets

CONTROL CIRCUIT AND CONTROL METHOD OF MULTIPHASE POWER CONVERTER

RELATED APPLICATIONS

This application claims the benefit of Chinese Patent Application No. 202311179626.9, filed on Sep. 11, 2023, which is incorporated herein by reference in their entirety.

FIELD OF THE INVENTION

The present invention generally relates to the field of power electronics, and more particularly, to control circuits and methods of multiphase power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In general, a multi-phase buck converter can include a plurality of buck converters that are controlled by a control circuit. The control circuit can generate a comparison signal by comparing a reference signal against a feedback signal that represents an output voltage of the multi-phase buck converter. For example, the pulse frequency of the comparison signal is twice the switching frequency of the single-phase buck converter. Then, a phase distributor in the control circuit may alternately distribute the pulses of the comparison signal to each buck converter, in order to drive each buck converter to operate in sequence. However, when the load suddenly increases or "transitions" or "jumps," the reference signal may continue to be greater than the feedback signal. This can make the comparison signal remain at a high level, such that the phase distributor may not distribute the pluses of the comparison signal to each buck converter. This can lead to a great difference in the inductor current of each buck converter, and thus current sharing control may not be effectively realized.

Figure 1:
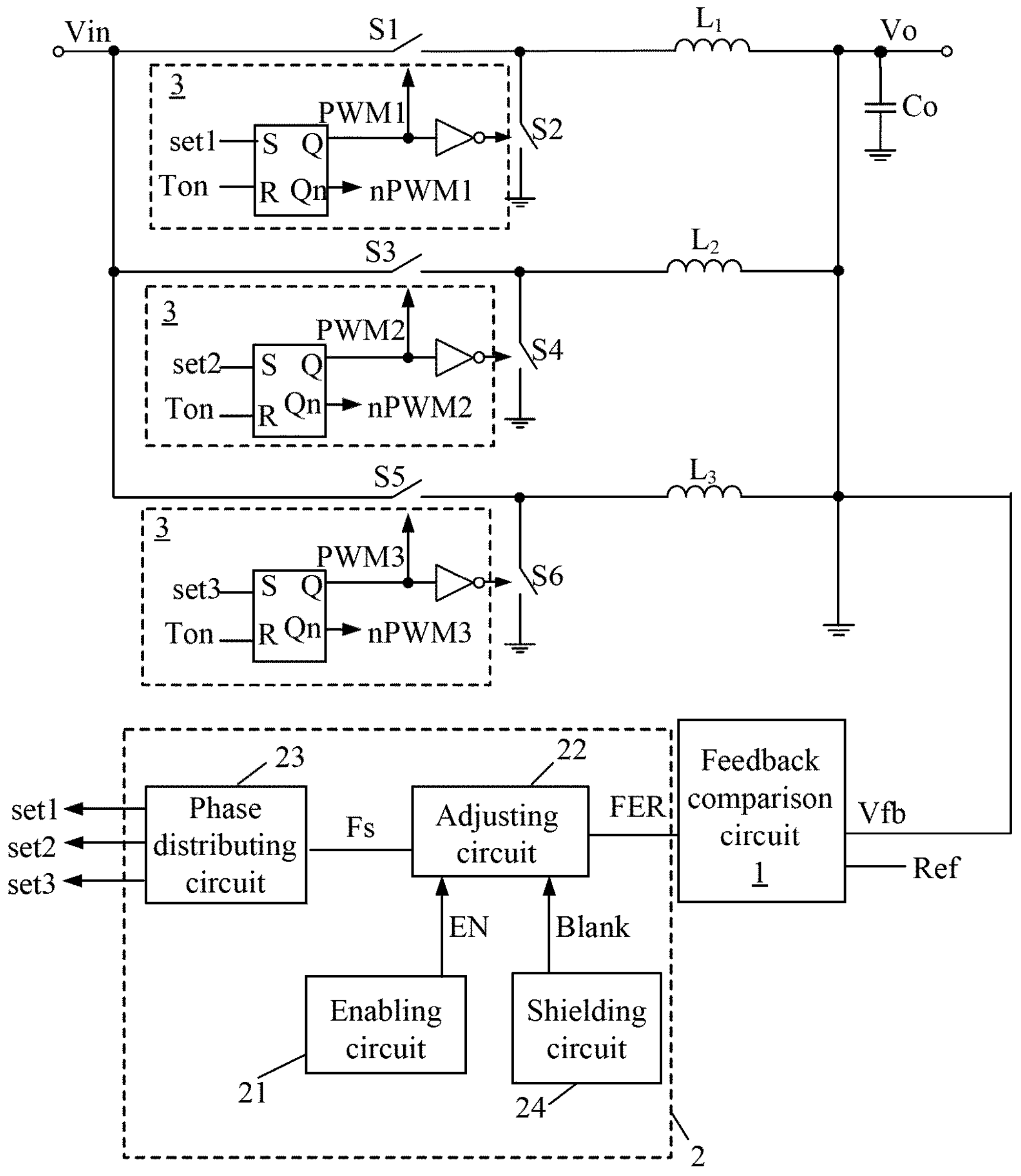
FIG. 1 is a schematic block diagram of an example control circuit and an example multiphase power converter, in accordance with embodiments of the present invention.

Referring now to FIG. 1, shown is a schematic block diagram of an example control circuit and an example multiphase power converter, in accordance with embodiments of the present invention. In this particular example, the multiphase power converter can include three power stage circuits connected in parallel, and each power stage circuit can be configured as a buck converter. The multiphase power converter of particular embodiments can include "n" power stage circuits, and any suitable DC-DC converter can be utilized, where n is an integer greater than 1.

In this particular example, three buck converters share a control circuit. The control circuit can control the operating timing sequence of a plurality of power stage circuits based on reference signal Ref and feedback signal Vfb characterizing output voltage Vo of the multiphase power converter in a first operation mode. The control circuit can also control the operating timing sequence of the plurality of power stage circuits based on fixed time Td and minimum turn-off time Tminoff in the second operation mode. As such, the operating timing sequence of the plurality of power stage circuits remains unchanged when the load of the multiphase power converter changes. For example, the control circuit can include feedback comparison circuit 1 for generating comparison signal FER based on reference signal Ref and feedback signal Vfb characterizing output voltage Vo.

The control circuit can also include pulse adjusting and distributing circuit 2, which may not adjust the pulses of comparison signal FER in the first operation mode. For example, the pulses of comparison signal FER may directly trigger each buck converter to operate. Pulse adjusting and distributing circuit 2 can adjust comparison signal FER in the second operation mode, such that each buck converter is triggered at a predetermined timing sequence when the load is heavy, thus ensuring that the inductor currents of each buck converter are evenly distributed.

Any existing constant on-time control (COT) scheme can be utilized to control the multiphase power converter. Under the COT control scheme, feedback comparison circuit 1 can be implemented in various ways. In one embodiment, reference signal Ref may be directly compared against feedback signal Vfb to generate comparison signal FER. In another embodiment, the error between reference signal Ref and feedback signal Vfb can be compensated to obtain feedback compensation signal Vc, and feedback compensation signal Vc may be compared against a current feedback signal representing the change trend of the sum of the inductor currents in each buck converter to generate comparison signal FER. For example, the current feedback signal can be a current sampling signal representing the sum of the inductor currents in each buck converter, and the inductor current in each buck converter can be obtained by sampling. In another example, the current feedback signal may be a current ripple signal simulating the change of the sum of the inductor current in each buck converter. Any suitable COT control method may be utilized in certain embodiments. In addition, other control methods (e.g., constant off-time [CFT] control, adaptive on-time control [whereby on-time Ton is not fixed, but is adjusted according to input voltage and/or output voltage], and adaptive off-time control, etc.) can also be utilized in certain embodiments.

For example, pulse adjusting and distributing circuit 2 can include enabling circuit 21, which can generate enabling signal EN when an active time of comparison signal FER (or trigger signal Fs) is greater than time threshold Th, in order to control the multiphase power converter to enter the second operation mode from the first operation mode. The pulse adjusting and distributing circuit 2 can also include adjusting circuit 22 for converting comparison signal FER into trigger signal Fs, and phase distributing circuit 23 for distributing the pulses of trigger signal Fs to each power stage circuit in turn and generating corresponding control signals set1, set2, and set3, in order to drive each power stage circuit in turn and realize staggered operation of each power stage circuit.

The control signal can control the switch states of the main power switch in the corresponding power stage circuit. In COT control or adaptive on-time control, the control signal can trigger the main power switch in the corresponding power stage circuit to turn on, while in CFT control or adaptive off-time control, the control signal can trigger the main power switch in the corresponding power stage circuit to turn off. Here, COT control is described as one particular example. In the COT control mode, the control circuit can also include three driving circuits 3 corresponding to the three buck converters. Three driving circuits 3 may respectively receive control signals set1-set3, and generate driving signals PWM1, PWM2, and PWM3, in order to control the turn-on moment of the main power switch in the corresponding power stage circuit, and to control the main power switch in the corresponding power stage circuit to turn off after a fixed time from the turn-on moment. For example, the fixed time corresponding to each power stage circuit may be same or different.

In particular embodiments, when the active time (e.g., the pulse width) of comparison signal FER or trigger signal Fs is less than time threshold Th, a closed-loop control method can be adopted, and at this time, the multiphase power converter may be in the first operation mode. In the first operation mode, comparison signal FER can be the same as trigger signal Fs, and both comparison signal FER and trigger signal Fs may be generated based on reference signal Ref and feedback signal Vfb. When the load suddenly increases (e.g., when the active time of comparison signal FER is greater than time threshold Th), an open-loop control method may be adopted, and at this time, the multiphase power converter is in the second operation mode. In the second operation mode, the pulses in trigger signal Fs may no longer be generated according to reference signal Ref and feedback signal Vfb, and an active pulse in trigger signal Fs may be generated every fixed time Td to trigger the next power stage circuit.

In the second operation mode, fixed time Td can generally be set to be smaller, and the frequency of trigger signal Fs may generally be much larger than that of comparison signal FER, such that the system has a better transient response speed, and the output signal can return to the steady state faster. Further, the smaller fixed time Td is, the faster the transient response speed. In particular embodiments, multiple buck converters can be in the state of automatic phase-shifting operating and parallel connection when the load changes, such that the distribution balance of the inductor current in each buck converter is guaranteed.

In addition, the open-loop control method may be adopted in the second operation mode, and an active pulse of trigger signal Fs is generated every fixed time Td to trigger the next power stage circuit to operate. In order to avoid the next power stage circuit being triggered when the turn-off time of main power switch of the next power stage circuit is less than the minimum turn-off time, the next power stage circuit can be triggered to operate when the turn-off time of main power switch of the next power stage circuit is greater than the minimum turn-off time, and then an active pulse of trigger signal Fs may be generated after fixed time Td to trigger another power stage circuit. In this way, when each power stage circuit is triggered, the turn-off time of the main power switch in each power stage circuit may not be less than the minimum turn-off time, and the operating timing sequence of each power stage circuit may remain unchanged.

In order to realize the above functions, pulse adjusting and distributing circuit 2 further can include shielding circuit 24, which can generate shielding signal Blank to adjusting circuit 22 when the turn-off time of the main power switch of the power stage circuit to be triggered is less than the minimum turn-off time, thereby adjusting the generation of active pulses in trigger signal Fs, in order to trigger the power stage circuit to operate when the turn-off time of main power switch in the power stage circuit is greater than the minimum turn-off time. Then, adjusting circuit 22 may resume generating an active pulse of trigger signal Fs every fixed time Td. That is, in the second operation mode, the state of the trigger signal corresponding to the next power stage circuit to be triggered can be related to whether the turn-off time of the main power switch of the next power stage circuit is not less than the minimum turn-off time. For example, when the turn-off time of the main power switch in the next power stage circuit to be triggered is less than the minimum turn-off time, the trigger signal may have no trigger effect, and the next power stage circuit can be triggered until the turn-off time of the main power switch is greater than the minimum turn-off time.

For example, in the second operation mode, when the turn-off time of the main power switch in the next power stage circuit to be triggered is less than the minimum turn-off time, trigger signal Fs can be controlled to remain in an inactive state without outputting an active pulse, thereby prohibiting triggering the next power stage circuit to operate. When the turn-off time of the main power switch in the next power stage circuit is greater than the minimum turn-off time, trigger signal Fs can be controlled to generate an active pulse, thereby triggering the next power stage circuit to operate, in order to ensure that the operating timing sequence of a plurality of power stage circuits remains unchanged.

For example, in the second operation mode, if the trigger signal is not adjusted by the minimum turn-off time, the next power stage circuit should be triggered every fixed time Td, so there is a trigger point time every fixed time Td. In some embodiments, shielding circuit 24 may determine whether the turn-off time of the main power switch of the corresponding power stage circuit to be triggered at corresponding trigger point time is less than the minimum turn-off time at each trigger point time. If so, adjusting circuit 22 can be controlled by shielding circuit 24 and may not generate or output the active pulse of trigger signal Fs. Also, adjusting circuit 22 can be controlled to generate or output the active pulse of trigger signal Fs until the turn-off time of the main power switch of the power stage circuit to be triggered is greater than the minimum turn-off time. Then, the active pulse of trigger signal Fs can be distributed to the power stage circuit to be triggered through phase distributing circuit 23. This implementation can be equivalent to delaying the start moment (e.g., the moment when it plays a trigger role) of the active pulse of trigger signal Fs to a moment after the turn-off time of the main power switch of the power stage circuit to be triggered is greater than the minimum turn-off time. The control method will be further described below with reference to the control waveform diagrams of FIGS. 2 and 3.

Figure 2:
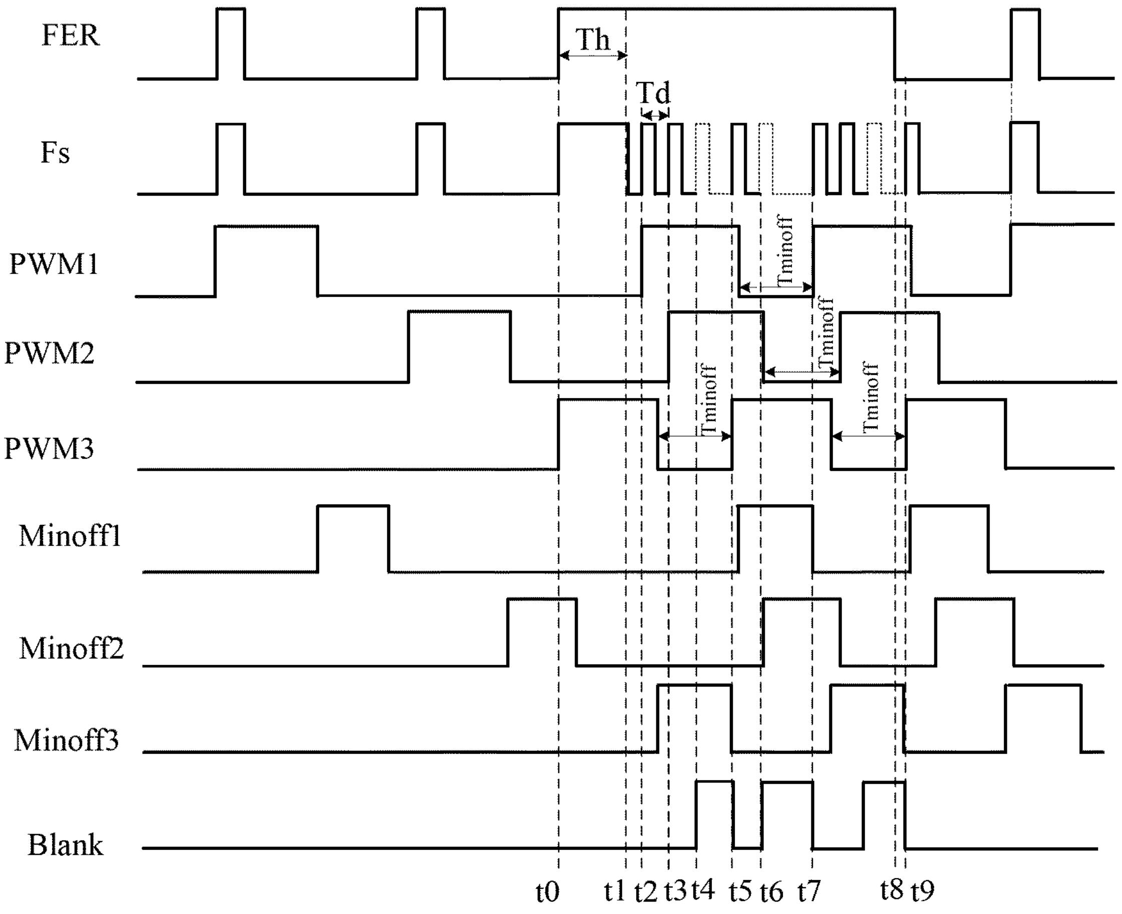
FIG. 2 is a waveform diagram of a first example controlling of a multiphase power converter, in accordance with embodiments of the present invention.

Referring now to FIG. 2, shown is a waveform diagram of a first example controlling of a multiphase power converter, in accordance with embodiments of the present invention. In this particular example, the duty ratio is set small (e.g., the duty ratio is less than 0.5), Minoff1 represents the minimum turn-off time indication signal of the first buck converter, Minoff2 represents the minimum turn-off time indication signal of the second buck converter, and Minoff3 represents the minimum turn-off time indication signal of the third buck converter. In this example, minimum turn-off time indication signals Minoff1-Minoff3 are introduced to determine whether the turn-off time of the main power switch of the corresponding buck converter is less than the minimum turn-off time. Other suitable approaches for determining whether the turn-off time of the main power switch of the corresponding buck converter is less than the minimum turn-off time can be utilized in certain embodiments.

Before moment t0, the multiphase power converter can be in the first operation mode, comparison signal FER may be generated based on reference signal Ref and feedback signal Vfb, the pulses of comparison signal FER can sequentially trigger the corresponding power switch in each power stage circuit to be turned on, and trigger signal Fs may be consistent with (e.g., the same as) comparison signal FER. Near moment t0, the load may suddenly change (e.g., suddenly increase), feedback signal Vfb can decrease, and reference signal Ref may remain greater than feedback signal Vfb, such that comparison signal FER continues to be at a high level. The pulse width of comparison signal FER can be greater than time threshold Th at moment t1, so from moment t1, the multiphase power converter may enter the second operation mode, and the open-loop control method can be carried out to generate trigger signal Fs in a predetermined manner.

At moment t2, an active pulse of trigger signal Fs can be generated, the active pulse can trigger the first buck converter, and driving signal PWM1 may be active. After fixed time Td from moment t2, that is, moment t3, a next active pulse of trigger signal Fs can be generated for triggering the second buck converter, and driving signal PWM2 may be active. After fixed time Td from moment t3, that is, moment t4, the next power stage circuit to be triggered can be the third buck converter. Shielding circuit 24 may detect that the turn-off time of the main power switch of the third buck converter is less than minimum turn-off time Tminoff, and minimum turn-off time indication signal Minoff3 can be at a high level, so shielding signal Blank may be active, trigger signal Fs can be controlled to remain in an inactive state without generating an active pulse.

Until moment t5, the turn-off time of the main power switch of the third buck converter may be greater than minimum turn-off time Tminoff, and shielding signal Blank can be inactive. At this time, trigger signal Fs may be controlled to generate an active pulse to trigger the third buck converter, and driving signal PWM3 can be active. Trigger signal Fs can be controlled to generate an active pulse when the turn-off time of the main power switch is greater than minimum turn-off time Tminoff or after the turn-off time of the main power switch is greater than minimum turn-off time Tminoff for a period of time, in order to trigger the corresponding buck converter. After fixed time Td from moment t5 to moment t6, the next power stage circuit to be triggered can be the first buck converter.

As shown in FIG. 2, minimum turn-off time indicator signal Minoff1 can be at a high level to indicate that the turn-off time of the main power switch of the first buck converter is less than minimum turn-off time Tminoff, so shielding signal Blank may be active, and trigger signal Fs can be controlled to not generate an active pulse. Until moment t7, the turn-off time of the main power switch of the first buck converter can be greater than minimum turn-off time Tminoff, shielding signal Blank may be inactive, and trigger signal Fs can be controlled to generate an active pulse to trigger the first buck converter. At moment t8, comparison signal FER may be at a low level, and as such does not affect the control circuit at this time. Because the pulse used to trigger the third buck converter is not output before, the multiphase power converter may not return to the first operation mode until the third buck converter is triggered again. Until moment t9, the turn-off time of the main power switch of the third buck converter can be greater than minimum turn-off time Tminoff, trigger signal Fs may still generate an active pulse to trigger the third buck converter, and then the multiphase power converter can return to the first operation mode and the corresponding buck converter is triggered according to the pulse of comparison signal FER.

Figure 3:
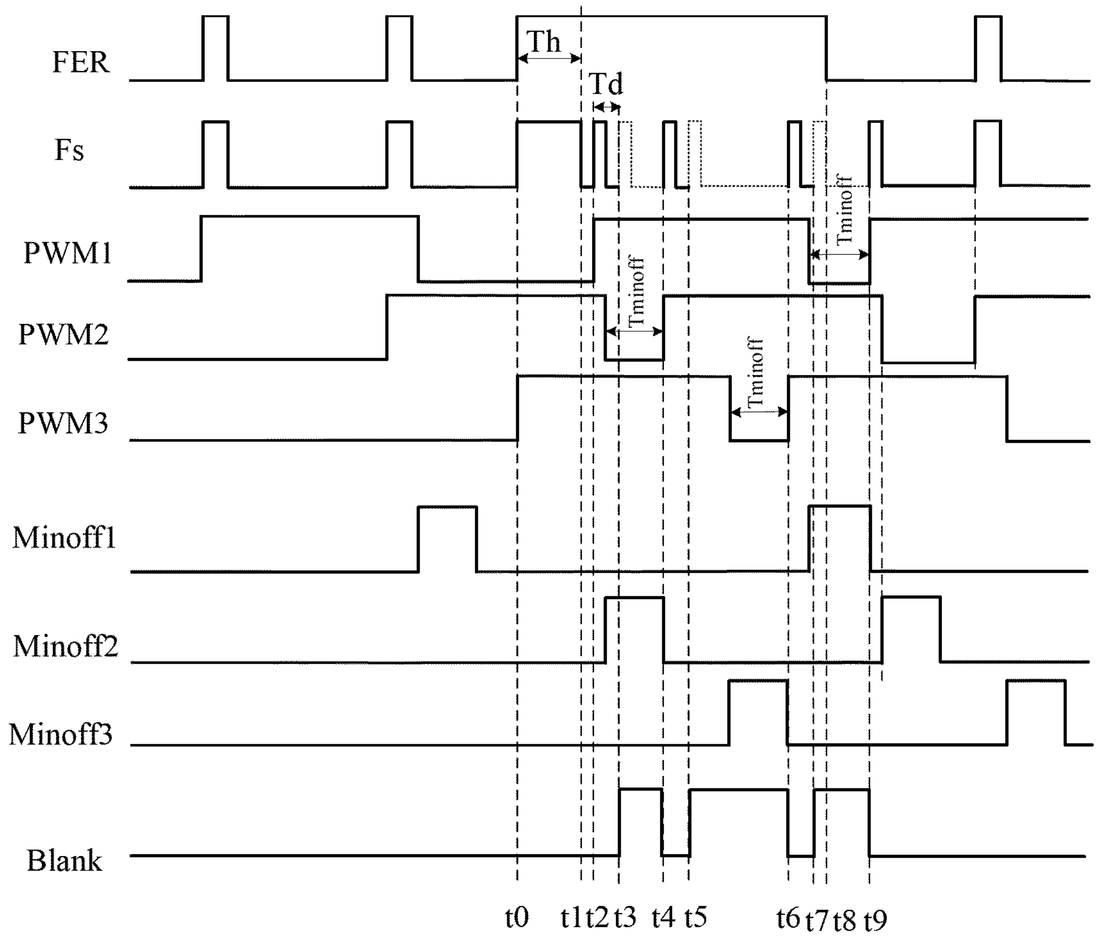
FIG. 3 is a waveform diagram of a second example controlling of a multiphase power converter, in accordance with embodiments of the present invention.

Referring now to FIG. 3, shown is a waveform diagram of a second example controlling of a multiphase power converter, in accordance with embodiments of the present invention. In this particular example, the duty ratio is set large (e.g., the duty ratio is greater than 0.5). Before moment t0, the multiphase power converter can be in the first operation mode, comparison signal FER may be generated based on reference signal Ref and feedback signal Vfb, the pulses of comparison signal FER can sequentially trigger the corresponding power switch in each power stage circuit to turn on, and trigger signal Fs may be consistent with comparison signal FER. At moment t0, the load can suddenly change or jumps (e.g., suddenly increase), feedback signal Vfb can decrease, and reference signal Ref may remain greater than feedback signal Vfb, such that comparison signal FER remains at a high level. The pulse width of comparison signal FER can be greater than time threshold Th at moment t1, so from moment t1, the multiphase power converter may enter the second operation mode, and the open-loop control method can be carried out to generate trigger signal Fs in a predetermined way.

At moment t2, an active pulse of trigger signal Fs may be generated, the active pulse can trigger the first buck converter, and driving signal PWM1 can be active. The second buck converter should have been triggered after fixed time Td from moment t2; that is, moment t3. However, minimum turn-off time indication signal Minoff2 can be at a high level to indicate that the turn-off time of the main power switch of the second buck converter is less than minimum turn-off time Tminoff at this time. As such, shielding signal Blank can be active and the trigger signal may be controlled to not generate an active pulse, thus prohibiting the second buck converter from being triggered at this time. Until moment t4, the turn-off time of the main power switch of the second buck converter can be greater than minimum turn-off time Tminoff, and shielding signal Blank may be inactive at this time, such that the trigger signal Fs is controlled to generate an active pulse to trigger the second buck converter, and driving signal PWM2 is active.

The third buck converter should have been triggered after fixed time Td from moment t4, that is, moment t5, but at this time, the on-time of the third buck converter may not have ended. That is, the turn-off time of the main power switch of the third buck converter can be less than the minimum turn-off time, so shielding signal Blank may be active, and trigger signal Fs controlled not to generate an active pulse. Until moment t6, the turn-off time of the main power switch of the third buck converter can be greater than minimum turn-off time Tminoff. At this time, shielding signal Blank may be inactive, such that trigger signal Fs is controlled to generate an active pulse to trigger the third buck converter, and driving signal PWM3 is active. After fixed time Td from moment t6 to moment t7, the first buck converter should have been triggered, but the turn-off time of the main power switch of the first buck converter is less than minimum turn-off time Tminoff, so shielding signal Blank can be active and the trigger signal controlled not to generate an active pulse.

At moment t8, comparison signal FER may be at a low level, and as such may not affect the control circuit at this time. Because the pulse used to trigger the first buck converter is not output before, the multiphase power converter may not return to the first operation mode until the first buck converter is triggered again. Until moment t9, the turn-off time of the main power switch of the first buck converter can be greater than minimum turn-off time Tminoff, trigger signal Fs may be controlled to generate an active pulse to trigger the first buck converter to turn on, and then the multiphase power converter can return to the first operation mode and the corresponding buck converter may be triggered according to the pulse of comparison signal FER.

It should be understood that the above description only takes one implementation as an example, and in other embodiments, the above-mentioned implementation can be adjusted to achieve the same or similar function. For example, in the second operation mode, when the turn-off time of the main power switch in the next power stage circuit to be triggered is less than the minimum turn-off time, an active pulse of the trigger signal can be generated normally, but the active pulse may be prohibited from triggering the next power stage circuit to operate. When the turn-off time of the main power switch in the next power stage circuit is greater than the minimum turn-off time, the corresponding control signal can be controlled to transition to an active state to trigger the next power stage circuit to operate. After the next power stage circuit is triggered, the next active pulse of the trigger signal can be controlled to be generated after fixed time Td to ensure that the operating timing sequence of a plurality of power stage circuits remains unchanged.

In particular embodiments, shielding circuit 24 can determine whether the turn-off time of the main power switch of the corresponding power stage circuit to be triggered at corresponding trigger point time is less than the minimum turn-off time at each trigger point time. If so, adjusting circuit 22 may output the active pulse of trigger signal Fs as usual, but phase distributing circuit 23 can be controlled to not distribute the active pulse to the power stage circuit to be triggered, and at the same time, adjusting circuit 22 can be controlled to stop continuously generating the active pulse of trigger signal Fs after generating the active pulse. When the turn-off time of the main power switch of the power stage circuit to be triggered is greater than the minimum turn-off time, phase distributing circuit 23 can make the control signal corresponding to the power stage circuit to be triggered active again to distribute it to the power stage circuit, thus triggering the power stage circuit. After that, adjusting circuit 22 may resume generating the active pulse of trigger signal Fs to trigger the next power stage circuit.

Figure 4:
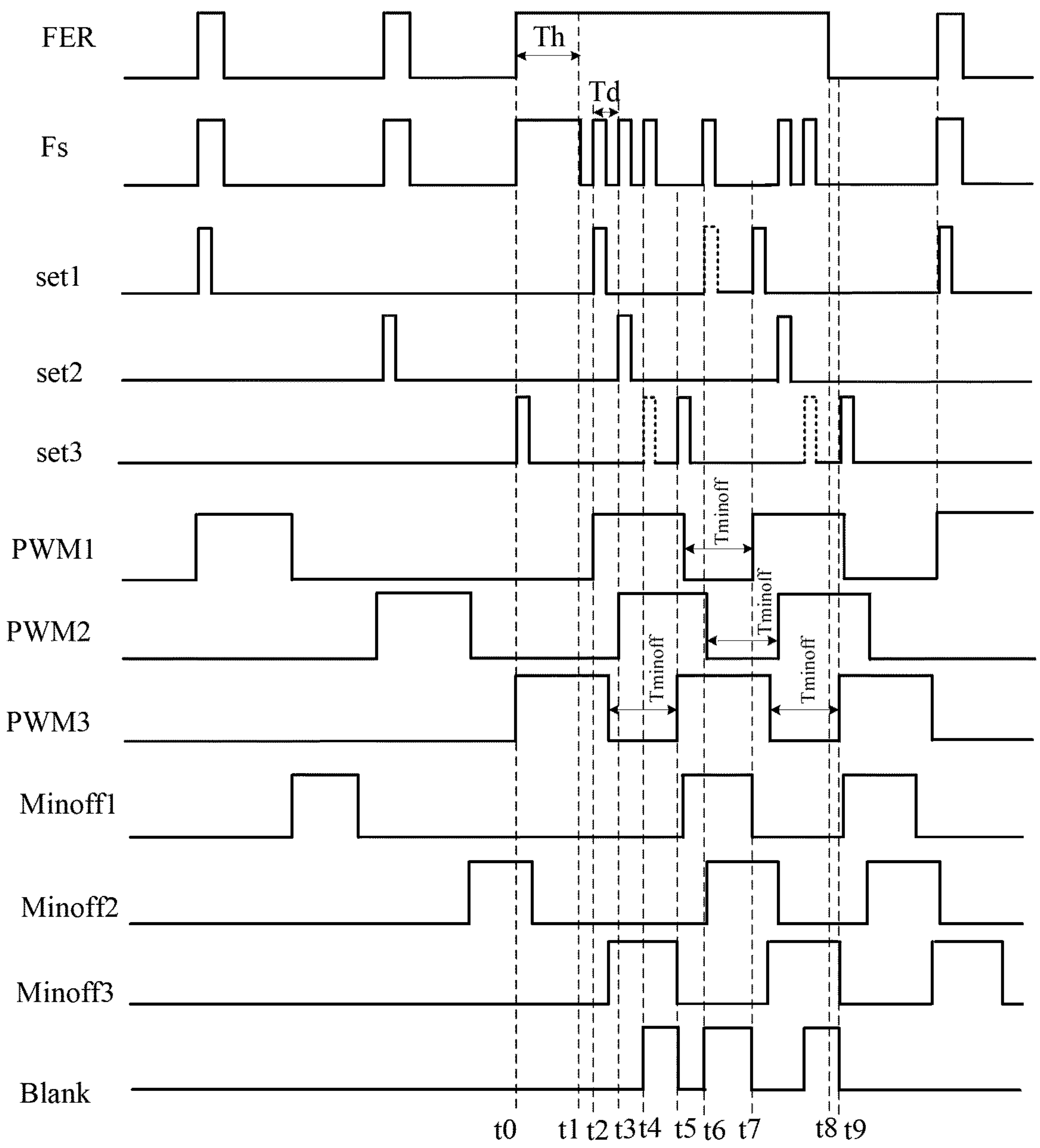
FIG. 4 is a waveform diagram of a third example controlling of a multiphase power converter, in accordance with embodiments of the present invention.

Referring now to FIG. 4, shown is a waveform diagram of a third example controlling of a multiphase power converter, in accordance with embodiments of the present invention. In this particular example, at moment t4, although it is detected that the turn-off time of the main power switch of the third buck converter is less than the minimum turn-off time, an active pulse of trigger signal Fs may still be generated, but can be shielded by phase distributing circuit 23 based on the active shielding signal Blank, and not distributed to the third buck converter, such that control signal set3 is inactive, and the third buck converter is not triggered. Until moment t5, when the turn-off time of the main power switch of the third buck converter is greater than minimum turn-off time Tminoff, shielding signal Blank can be inactive, so phase distributing circuit 23 can make control signal set3 transition to the active state again to trigger the third buck converter.

For example, when shielding signal Blank is inactive, a driving pulse can be generated to make control signal set3 transition from the inactive state to the active state. The time when control signal set3 transitions to the active state again can be a moment when the turn-off time is slightly greater than minimum off time Tminoff, or after the turn-off time is greater than minimum off time Tminoff for a period of time. In addition, under the above control mode, during the period when shielding signal Blank is active, adjusting circuit 22 may not continue to generate the active pulse of trigger signal Fs. Trigger signal Fs can resume generation of active pulses every fixed time Td until the third buck converter is triggered again, thus ensuring that the operating timing sequence of multiple power stage circuits remains unchanged. The control mode after that is the same as that in FIG. 2, and will not be described in detail.

In particular embodiments, under any duty ratio condition, when the load increases, the operating timing sequence of each power stage circuit can remain unchanged, and each power stage circuit may operate in a staggered phase in turn, thus automatically realizing the balance of the inductor current in each power stage circuit. The above examples focus on controlling the turn-on time of the main switch in each power stage circuit, there may be no restriction on how to control the turn-off time of the main switch, and the turn-off time can be controlled by any suitable approach in certain embodiments.

Figure 5:
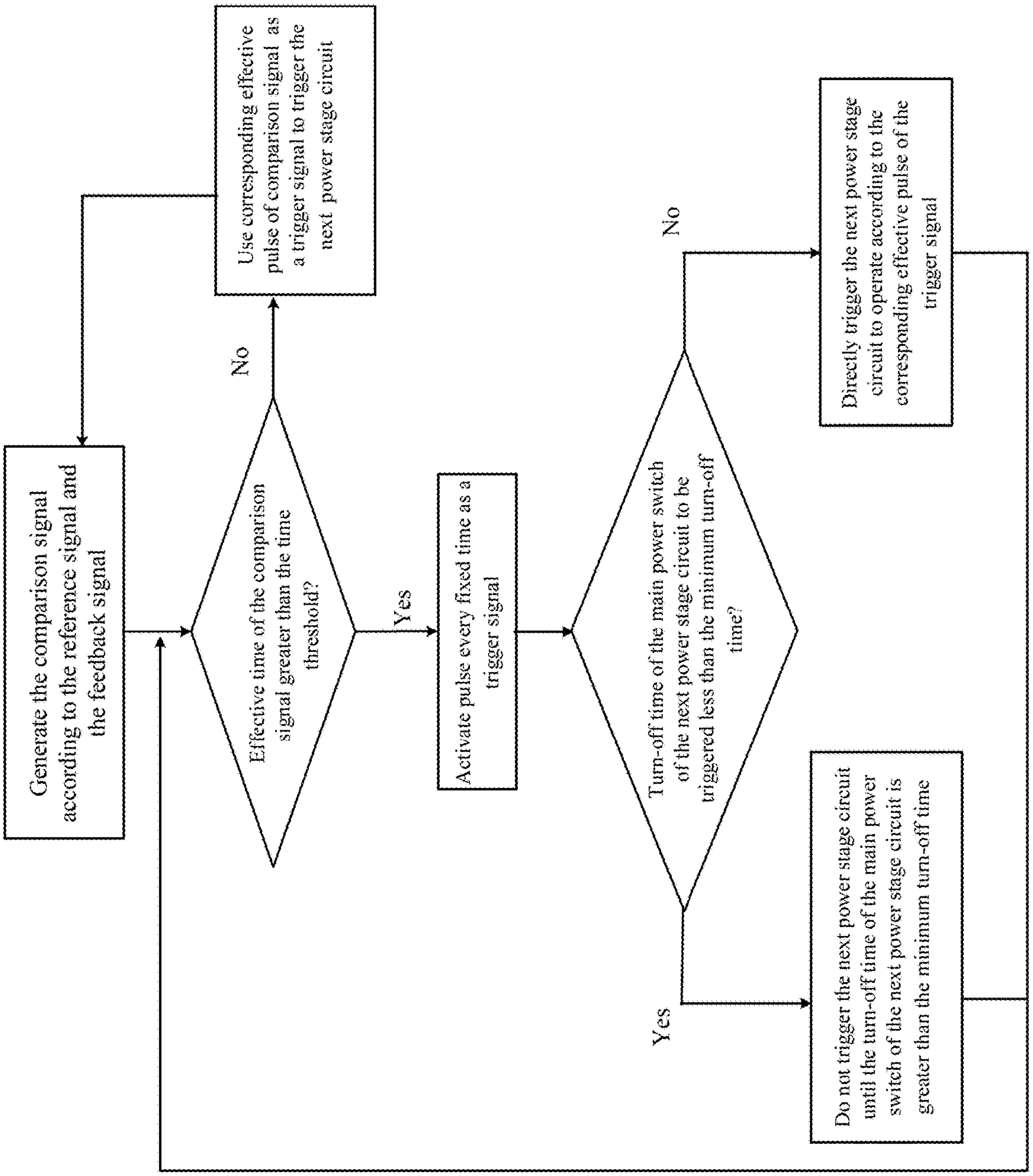
FIG. 5 is a flow diagram of an example control method of a multiphase power converter, in accordance with embodiments of the present invention.

Referring now to FIG. 5, shown is a flow diagram of a control method of a multiphase power converter, in accordance with embodiments of the present invention. Firstly, in this particular example, a comparison signal can be generated according to a reference signal and a feedback signal. Then, it may be determined whether the active time of the comparison signal is greater than the time threshold. If not, the first operation mode can be entered, and the active pluses of comparison signal can be used as a trigger signal to trigger the next corresponding power stage circuit, and then restart the above steps. If yes, the second operation mode may be entered, and an active pulse as a trigger signal can be generated after a fixed time. Then, in the second operation mode, it can be determined whether the turn-off time of the main power switch of the next power stage circuit to be triggered is less than the minimum turn-off time at the trigger point time. If yes, the next power stage circuit may not be triggered until the turn-off time of the main power switch of the next power stage circuit is greater than the minimum turn-off time. If not, the power stage circuit can be directly triggered to operate according to the active pulse of the trigger signal.

After that, it may be determined whether the active time of the comparison signal is greater than the time threshold again. If the active time of the comparison signal is greater than the time threshold, this can indicate that the multiphase power converter is still in the second operation mode, and the above steps continued. If not, this can indicate that the multiphase power converter has transitioned out of the second operation mode and started to enter the first operation mode again. After the comparison signal changes from an active level to an inactive level, the active time of the comparison signal can be less than the time threshold, and at this time, it may wait for the next active comparison signal to be generated as a trigger signal. In particular embodiments, when there are multiple power stage circuits, each power stage circuit can execute the above process. In addition, the way to determine whether the turn-off time of the main power switch of the next power stage circuit is less than the minimum turn-off time, and the way not to trigger this time but to trigger until the turn-off time is greater than the minimum turn-off time, can be any suitable implementations in certain embodiments.

In particular embodiments, the multi-phase power converter of the invention may adopt an open-loop control method to generate trigger pulses when the load suddenly increases, such that the power stage circuits of each phase can be in the state of automatic phase-shifting operating and parallel connection when the load changes, and thus ensuring the distribution balance of the inductor current of each power stage circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a multiphase power converter comprising a plurality of power stage circuits coupled in parallel, the method comprising:

a) in a first operation mode, controlling an operating timing sequence of the plurality of power stage circuits according to a reference signal and a feedback signal representing an output voltage of the multiphase power converter; and b) in a second operation mode, controlling the operating timing sequence of the plurality of power stage circuits according to a fixed time and a minimum turn-off time, in order to ensure that the operating timing sequence of the plurality of power stage circuits remains unchanged in response to transition of a load of the multiphase power converter.

2. The method of claim 1, wherein in the second operation mode, when one of the plurality of power stage circuits is triggered, a turn-off time of a main power switch in the one of the plurality of power stage circuits is not less than the minimum turn-off time.

3. The method of claim 1, further comprising:

a) generating a trigger signal according to the reference signal and the feedback signal in the first operation mode; and b) sequentially triggering each power stage circuit to operate according to active pulses of the trigger signal.

4. The method of claim 3, further comprising controlling the multiphase power converter to enter the second operation mode from the first operation mode when an active time of the trigger signal is greater than a time threshold.

5. The method of claim 1, further comprising:

a) in the second operation mode, generating an active pulse every fixed time to form a trigger signal; and b) sequentially triggering each power stage circuit to operate according to active pulses of the trigger signal.

6. The method of claim 1, wherein in the second operation mode, states of a trigger signal corresponding to a next power stage circuit are controlled by determining whether a turn-off time of the next power stage circuit is not less than the minimum turn-off time.

7. The method of claim 1, wherein in the second operation mode, when a turn-off time of a main power switch in a next power stage circuit to be triggered is less than the minimum turn-off time:

a) disabling a trigger signal; and b) triggering the next power stage circuit to operate until the turn-off time of the main power switch is greater than the minimum turn-off time.

8. The method of claim 7, further comprising, in the second operation mode, when the turn-off time of the main power switch in the next power stage circuit to be triggered is less than the minimum turn-off time, controlling the trigger signal to remain in an inactive state to prohibit triggering the next power stage circuit to operate.

9. The method of claim 8, further comprising, when the turn-off time of the main power switch in the next power stage circuit is greater than the minimum turn-off time, controlling the trigger signal to generate an active pulse to trigger the next power stage circuit to operate, such that the operating timing sequence of the plurality of power stage circuits remains unchanged.

10. The method of claim 7, further comprising, in the second operation mode, when the turn-off time of the main power switch in the next power stage circuit to be triggered is less than the minimum turn-off time, generating an active pulse of the trigger signal normally, wherein the active pulse is prohibited from triggering the next power stage circuit to operate.

11. The method of claim 10, further comprising:

a) when the turn-off time of the main power switch in the next power stage circuit is greater than the minimum turn-off time, activating a control signal corresponding to the next power stage circuit to trigger the next power stage circuit to operate, wherein the control signal controls switching states of the main power switch in the power stage circuit; and b) after the next power stage circuit is triggered, controlling a next active pulse of the trigger signal to resume normal generation, such that operating timing sequence of the plurality of power stage circuits remains unchanged.

12. The method of claim 7, further comprising determining whether the turn-off time of the main power switch in the next power stage circuit is less than the minimum turn-off time at each trigger point time, wherein an interval between two adjacent trigger point times is the fixed time.

13. A control circuit for a multiphase power converter comprising a plurality of power stage circuits coupled in parallel, the control circuit comprising:

a) a feedback control circuit configured to generate a comparison signal according to a reference signal and a feedback signal characterizing an output voltage of the multiphase power converter; and b) a pulse adjusting and distributing circuit configured to control an operating timing sequence of the plurality of power stage circuits according to the comparison signal in a first operation mode, and to control the operating timing sequence of the plurality of power stage circuits according to a fixed time and a minimum turn-off time in a second operation mode, in order to ensure that the operating timing sequence of the plurality of power stage circuits remains unchanged in response to transition of a load of the multiphase power converter.

14. The control circuit of claim 13, wherein the pulse adjusting and distributing circuit is configured to control, when one of the plurality of power stage circuits is triggered, a turn-off time of a main power switch in the one of the plurality of power stage circuits is not less than the minimum turn-off time in the second operation mode.

15. The control circuit of claim 13, wherein the pulse adjusting and distributing circuit comprises an enabling circuit that is configured to generate an enabling signal when an active time of the comparison signal is greater than a time threshold, in order to control the multiphase power converter to enter the second operation mode from the first operation mode.

16. The control circuit of claim 13, wherein the pulse adjusting and distributing circuit comprises:

a) an adjusting circuit configured to convert the comparison signal into a trigger signal; and b) a phase distributing circuit configured to sequentially distribute pulses of the trigger signal to each power stage circuit to generate corresponding control signals, in order to sequentially drive each power stage circuit.

17. The control circuit of claim 16, wherein the adjusting circuit is configured to generate an active pulse every fixed time when an active time of the comparison signal is greater than the time threshold to form the trigger signal, and to sequentially trigger each power stage circuit to operate according to pulses of the trigger signal.

18. The control circuit of claim 16, wherein the pulse adjusting and distributing circuit further comprises:

a) a shielding circuit configured to generate a shielding signal to the adjusting circuit to adjust the generation of active pulses of the trigger signal in the second operation mode, in order to trigger the next power stage circuit to operate when a turn-off time of the main power switch is greater than the minimum off time;

b) wherein when it is detected that the turn-off time of a main power switch in a next power stage circuit to be triggered is less than the minimum turn-off time, the shielding signal is active; and c) wherein when it is detected that the turn-off time of the main power switch is greater than the minimum turn-off time, the shielding signal is inactive.

19. The control circuit of claim 18, wherein the adjusting circuit is configured to control the trigger signal to remain in an inactive state when the shielding signal is active, and control the trigger signal to generate an active pulse to trigger the next power stage circuit to operate when the shielding signal changes from an active state to an inactive state.

20. The control circuit of claim 18, wherein:

a) the phase distributing circuit is configured to shield the pulse of the trigger signal transmitted by the adjusting circuit when the shielding signal is active, and to control a corresponding control signal to be an active state to trigger the next power stage circuit when the shielding signal is inactive; and b) the control signal is used to control switching states of the main power switch in the power stage circuit.

* * * * *